No. 770,738. PATENTED SEPT. 27, 1904.
H. C. CHESSMAN.
ADJUSTABLE POT HANGER AND PLANT LIFTER.
APPLICATION FILED FEB. 29, 1904.
NO MODEL.
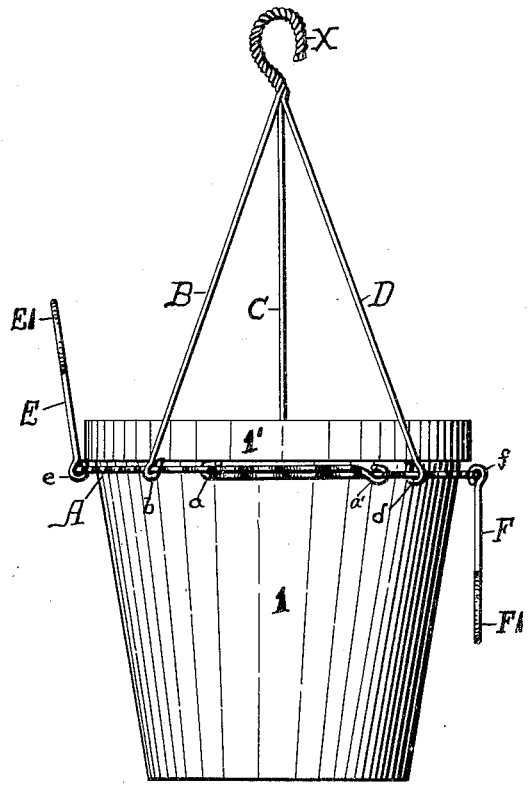
Fig. 1.
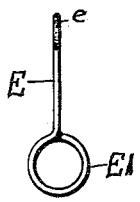
Fig. 4.
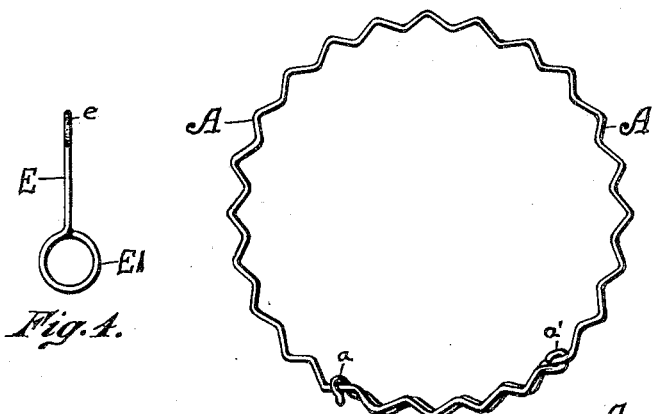
Fig. 2.
Fig. 5.
Fig. 3.
WITNESSES,
S. C. Duvall.
R. E. Randly.
INVENTOR,
H. C. CHESSMAN,
by his attorney,
Robert W. Randle No. 770,738.

Patented September 27, 1904.

UNITED STATES PATENT OFFICE.

HENRY C. CHESSMAN, OF RICHMOND, INDIANA.

ADJUSTABLE POT-HANGER AND PLANT-LIFTER.

SPECIFICATION forming part of Letters Patent No. 770,738, dated September 27, 1904.

Application filed February 29, 1904. Serial No. 195,810. (No model.)

*To all whom it may concern:*

Be it known that I, HENRY C. CHESSMAN, a citizen of the United States, residing in the city of Richmond, in the county of Wayne, and in the State of Indiana, have invented new and useful Improvements in Adjustable Pot-Hangers and Plant-Lifters; and I hereby declare the following description to be a full, clear, and exact specification of the invention, such as will enable others skilled in the art to which it pertains to make and use the same.

A generic object of my present invention is to provide adjustable pot-hangers and plant-lifters which will be neat, artistic, and attractive in appearance, compact and symmetrical in proportions, strong and durable in construction, positive in action, and which will be capable of a wide scope of usefulness and efficiency.

A more specific object is the provision of a device for adjustable connections to various size pots, whereby the pot may be suspended, and also whereby the pot may be easily lifted from a jardinière or the like.

A further specific object is the provision of a device which may be adjusted circumferentially for attachment to flower-pots whereby the flower-pot may be suspended or whereby it may be lowered into and lifted from a receptacle of only a slightly-greater capacity—such, for instance, as a jardinière.

My invention consists in an adjustable pot-hanger and plant-lifter containing in its structure the several distinctive features stated, and the relative disposition of the several parts substantially as particularly described otherwheres in this specification, and in the legitimate combinations herein set forth with reference to each other and to the entire construction.

Referring now to the accompanying drawings, forming a part of this specification, for an illustration of my preferred construction, Figure 1 shows my invention in elevation and in connection with a flower-pot of ordinary form. Fig. 2 is a plan view of the body portion of my invention, showing the ends thereof overlapping and interlocking with each other. Fig. 3 is a detail of the two ends of the body portion as separated from engagement with each other. Fig. 4 is a detail elevation of one of the lifting-fingers, and Fig. 5 is a detail.

Similar reference characters denote and refer to like parts throughout the several views of the drawings.

The body portion of my invention consists of a single length of crimped or corrugated wire and is designated by the index character A. On each end of the body A is formed a hook $a$ and $a'$, said hooks being oppositely disposed and integral with the body A, as shown. It will now be clearly manifest that the body portion A may first be straightened out and the end then brought together, forming a circle of the body, and the hooks $a$ and $a'$ may then be interlocked with each other, whereby the body A is formed in its largest dimension. Then by disengaging the hooks $a$ and $a'$ the ends of the body A may be overlapped sufficiently to form a circle of the requisite size, and the hooks $a$ and $a'$ are then engaged with the respective opposite corrugations, substantially as shown in Figs. 1 and 2, and they will be held in engagement therewith by the tension of the body A.

The index-figure 1 denotes a flower-pot, which is shown for the purpose of illustrating the attachment and relative disposition of my invention therewith, and 1' denotes the chime of the said pot 1.

The letters B, C, and D designate the three suspensory arms of identical construction formed with hooks $b$, $c$, and $d$ on their respective lower ends to engage with the body A at three equally-divided points in its circumference, as shown in Fig. 1. From their lower ends the said arms B, C, and D converge upward with their upper ends twisted together, and the said twisted portions are then formed into a suspending-hook X.

The letters E and F denote the two lifting-fingers, which are of identical construction and are equipollent, each being produced from a single length of wire, having eyelets $e$ and $f$, respectively, formed on one end to receive loosely therethrough the body A and with the eyes E' and F', respectively, formed on their opposite ends to provide finger-holds for the attendant.

It will now be seen that the body A may be adjusted circumferentially around the pot 1 with the arms B, C, and D thereto attached, and the pot and its contents may be suspended, by means of the hook X, from some stationary point, and also that should it be desired to position the pot 1 in a jardinière or the like the arms B, C, and D may be laid aside, and in this case the fingers E and F would be equally positioned with reference to the circumference of the body A, and by positioning both of said fingers as is the finger E in Fig. 1 the attendant may place his fingers in the eyes E' and F', suspending the pot 1 and gently lowering it into the jardinière, after which, if there be sufficient space between the pot and the jardinière, the fingers E and F may be turned down, as is the finger F in Fig. 1, between the outer wall of the pot and the inner wall of the jardinière. Without the employment of a device of this character it has been found quite difficult to remove a pot from a jardinière, especially when the space between their walls was limited; but in this instance the fingers E and F are easily accessible and can be turned up, as is the finger E in Fig. 1, and then by inserting the fingers of the attendant in the eyes E' and F' the pot can be readily lifted out of the jardinière.

While I have illustrated and described the best means now known to me for carrying out the intentions of my invention, I desire it to be understood that I do not restrict myself to the exact details of construction shown and described, but hold that any slight changes or variations in such details as would suggest themselves to the ordinary mechanic would clearly fall within the limits and scope of my invention.

Having now fully shown and described my invention and the best means for its construction and adaptation to me known at this time, what I claim, and desire to secure by Letters Patent of the United States, is—

1. The combination, in an adjustable pot-hanger and plant-lifter, of a corrugated body-wire to surround a pot immediately below its chime, hooks formed on the free ends of the body-wire whereby the body-wire may be adjusted circumferentially around pots of various sizes, a pair of lifting-fingers loosely connected to the body-wire on opposite sides, the free ends of said fingers being bent to form finger-holds, and means for suspending all of said parts from a single point, substantially as described.

2. The combination, with a pot having a chime, of a body-wire to surround the pot below the chime, a hook formed on each end of the body-wire, for engaging with the opposite portion of the body-wire to vary the circumference of said wire, a pair of lifting-fingers connected to the body-wire on opposite sides of the pot, loops formed on the free ends of said fingers to provide finger-holds, a plurality of arms having their lower ends connected to said body-wire and then converging upward with their upper ends connected and forming a hook whereby all of said parts may be suspended from a single point, all substantially as shown and described.

3. The combination with a pot having a chime, of a corrugated body-wire adapted to surround the pot, hooks formed on the ends of the body-wire and adapted to engage in the corrugations of the body-wire, a pair of fingers loosely connected to the body-wire, loops formed on the free ends of said fingers to provide finger-holds, a plurality of arms with their lower ends connected to the body-wire at equal distances apart and then converging upward with their upper ends twisted together forming a hook, all substantially as shown and described and for the purposes set forth.

In testimony whereof I have hereunto signed my name to this specification, this 27th day of February, 1904, in the presence of two subscribing witnesses.

HENRY C. CHESSMAN.

Witnesses:
R. W. RANDLE,
R. E. RANDLE.